United States Patent [19]
Ross, III

[11] Patent Number: 5,719,669
[45] Date of Patent: Feb. 17, 1998

[54] LENS PARAMETER MEASUREMENT USING OPTICAL SECTIONING

[75] Inventor: Denwood F. Ross, III, Green Cove Springs, Fla.

[73] Assignee: Johnson & Johnson Vision Products, Inc., Jacksonville, Fla.

[21] Appl. No.: 806,999

[22] Filed: Feb. 26, 1997

Related U.S. Application Data

[63] Continuation of Ser. No. 536,158, Sep. 29, 1995, abandoned.
[51] Int. Cl.$^6$ ............................................. G01B 9/00
[52] U.S. Cl. ............................................. 356/124; 356/127
[58] Field of Search ............................ 356/124–127, 356/237, 239

[56] References Cited

U.S. PATENT DOCUMENTS

| | | | |
|---|---|---|---|
| 3,988,068 | 10/1976 | Sprague | 356/124 |
| 5,459,330 | 10/1995 | Venaille et al. | 356/239 |
| 5,539,837 | 7/1996 | Lindmark | 356/124 |

FOREIGN PATENT DOCUMENTS 2057832   12/1991   Canada.

*Primary Examiner*—Hoa Q. Pham

[57] ABSTRACT

An arrangement for measuring desired parameters of a contact lens by optical sectioning which comprises a support fixture on which a contact lens is positioned. The support fixture includes a container in which a pedestal is positioned, and the container is filled with a saline solution. The contact lens is placed on the pedestal completely immersed in the saline solution. A line of light is generated and directed by imaging and shaping optical elements over the edge of the container and through a selected diameter of the contact lens. An imaging camera detects and image of the light scattered at the surfaces of the contact lens at the selected diameter, which is captured by a frame grabber and is digitally stored for subsequent image processing and determination of the desired parameters of the contact lens. The analysis provides at least four basic parameters of the contact lens including the diameter (D), front radius of curvature (FC), back radius of curvature (BC), and center thickness (CT), and can also provide the lenticular curve radius, the peripheral curve radius, the sagittal height, aspherical forms and deviations of the several measured curvatures, and the power of the lens.

28 Claims, 5 Drawing Sheets

LENS PARAMETER MEASUREMENT USING OPTICAL SECTIONING

This is a continuation of application Ser. No. 08/536,158, filed Sep. 29, 1995 now abandoned.

BACKGROUND OF THE INVENTION

1. Field of the Invention

The present invention relates generally to the measurement of contact lens parameters by using an optical sectioning technique, and more particularly pertains to a lens parameter measurement using optical sectioning.

2. Discussion of the Prior Art

The accurate measurement of contact lens parameters has presented a problem in the prior art. While a current method for measuring a contact lens diameter (D) is reliable, no method exists at all for measuring the front radius of curvature (FC) of a contact lens. The method for measuring the back radius of curvature (BC) of a contact lens is instrument/operator specific, and the methods for measuring the center thickness (CT) of a contact lens involve physically deforming or destroying the lens.

The measurement of the base curve and center thickness of a contact lens can be very difficult. The current base curve measurement is performed by an ultrasound technique for measuring the back sag at a predetermined diameter. Aside from errors introduced by variations in the temperature of the solution in which the contact lens is immersed, the lens itself is not perfectly spherical, and thus does not fulfill the requirements of the geometrical equation used to transform back sagittal height readings into radius of curvature values. In addition, the device cannot measure the front radius of curvature of the contact lens, nor can it measure the asphericity or toricity of either the front or back curve of the contact lens. The center thickness is measured by lowering a plunger onto a wet contact lens mounted on a pedestal, and measuring the difference in height from the pedestal alone. This measurement technique suffers from variable rates of material deformation from the measuring force attributable to material modulus, inconsistent plunger counter weight force, and lens design. A noncontacting measurement technique would be much preferable.

SUMMARY OF THE INVENTION

Accordingly, it is a primary object of the present invention to provide a lens parameter measurement using optical sectioning A further object of the subject invention is the provision of an optical sectioning technique for measuring at least four basic parameters of a contact lens comprising the diameter (D), front radius of curvature (FC), back radius of curvature (BC), and center thickness (CT), which can be measured directly or deduced from a cross-section of the lens. The present invention uses a line or sheet of light to illuminate and highlight a cross-sectional view of an immersed lens. That cross-sectional view contains all of the information necessary to obtain all four parameters directly, without contacting or destroying the lens.

In one embodiment, the 4880 A line of an $Ar^{2+}$ laser is collimated, and then focused with a cylindrical lens onto a contact lens. The resulting line of light is directed onto a support fixture with a cup which contains a slotted pedestal. The cup is filled with a saline solution, and the lens is placed on a pedestal completely immersed under the surface of the solution, and the line of light is adjusted so as to pass through the middle of the contact lens. A charge coupled television (CCTV) camera detects the light scattered from the surfaces of the contact lens, and a software program analyzes the image to obtain the desired parameters of the contact lens.

The present invention has many advantages over present prior art techniques. It is noncontacting, and operates in reflection so that the optical inspection can be performed "in-package", and is very compact. Also, it combines in one instrument the functions now accomplished by a microcomparator, ultrasound gauge, Rehdergauge, and microscope. Additionally, the front curve radius of the contact lens can be measured, which is not presently possible and could be of great benefit, particularly for aspheric contact lenses.

The optical sectioning technique provides a very useful method for determining a contact lens diameter, front and back curvature, thickness and power. The measurement of these parameters is much more accurate than any current prior art methods, and can advantageously be used to measure lenses in packages. The optical sectioning technique is also much more accurate than all current prior art methods, and is less expensive than the multiple instruments in usage today. The measurement technique is noncontacting, nondestructive, and nonintrusive. Image processing is employed to enhance the image and calculate the lens parameters. It also can measure aspects of contact lenses which no other prior methods can measure, such as the asphericity of the front and back surfaces. Lens designs using asphericity cannot be measured using any known prior art method, nor can any unintentional asphericity be detected. The optical sectioning technique can also be applied to bifocal lenses, particularly concentric annular ring contact lens designs.

The technical approach is to form a line of light which is directed through a lens, immersed in a saline solution, and positioned on a pedestal. The line of light travels parallel to the lens center of rotation axis and bisects the lens. Scattered light is imaged onto a CCD camera, and the resultant image is enhanced and analyzed. The optical elements used in the detection system can include a flat, a wedge, and an imaging lens system. The resultant image is analyzed using a nonlinear least squares fitting data processing approach.

A wideband light source is preferably used to decrease pixellation from speckle. The instrument is designed for compactness and ease of usage with interchangeable sample holders or cells for different types of contact lenses, single button operation, and easy calibration.

In accordance with the teachings herein, the present invention provides a method and apparatus for measuring desired parameters of a contact lens by optical sectioning which comprises positioning a contact lens on a support fixture. A line of light is generated and directed through a selected diameter of the contact lens. An image is detected of the light scattered at the surfaces of the contact lens at the selected diameter, and the detected light image is analyzed to measure and determine the desired-parameters of the contact lens.

In greater detail, the analysis provides the measured parameters of at least four basic parameters of a contact lens comprising the diameter (D), front radius of curvature (FC), back radius of curvature (BC), and center thickness (CT). The analysis can provide additional measured parameters of the contact lens which include the front radius of curvature with aspheric form, the back radius of curvature with aspheric form, the lenticular curve radius, the peripheral curve radius, the sagittal height, aspherical deviations, and the power of the lens.

The line of light is directed onto a support fixture which includes a container in which a pedestal is positioned, and the container is filled with a saline solution. The contact lens is placed on the pedestal completely immersed in the solution, and the line of light is directed over the edge of the container and through a selected diameter of the contact lens. A charge coupled television (CCTV) imaging camera detects the image of the light scattered from the surfaces of the contact lens. The imaging camera is preferably positioned at a right angle to a light source used to illuminate the contact lens. The imaging camera is elevated with respect to and views the lens at an angle greater than the critical angle relative to the surface of the saline solution, which is the minimum angle at which light is transmitted and below which all light is reflected and none transmitted by the surface of the saline solution.

The optical sectioning measurement can advantageously be utilized on a contact lens which is immersed in saline packaging solution in a packaging container.

The detection system can include an optical flat, an optical prism mounted on the optical flat, and an optical imaging system.

The image is analyzed by a software program which uses a nonlinear least squares fitting data processing approach. The analysis includes an image processing macro routine which combines several morphological routines into one sequence which is executed for each image, the result of which is stored digitally, and the stored image is then input to a software routine for calculation of selected parameters of the contact lens. The parameter calculation is based upon a nonlinear regression based upon the residuals error from a Taylor Series expansion of an expected contact lens curve profile.

The beam of light is shaped and focused in an arrangement in which light from a light source passes through a spatial filter, is collimated by a collimating lens, and is focused by a cylindrical lens into a line of light at the contact lens being measured. The line of light is directed onto the support fixture which includes a central support button, surrounded by alignment posts to properly position a contact lens within the support fixture. The central support button and alignment posts are positioned at a level A in the fixture, and the top of the alignment posts do not extend above a level B. An optical flat with a prism positioned thereon is slidably positioned on slide rails at the level B. A cavity in the fixture is filled with saline solution, and the optical flat is guided by the slide rails to slide to one side while clearing the area over the central support button and alignment posts. The contact lens being measured is lowered into the saline solution between the alignment posts, and comes to rest on top of the central support button in an essentially horizontal position. The optical flat is then slided to a second opposite side to position it above the contact lens for an optical sectioning measurement.

In the detection arrangement, light from the illuminated contact lens is directed by imaging optics onto a camera, an image is captured by a frame grabber and digitally stored in memory, the stored digital image is then subjected to image processing, including image enhancement, curve fitting, and measurement of parameters of the lens by the application of selected known algorithms which are available commercially in software.

BRIEF DESCRIPTION OF THE DRAWINGS

The foregoing objects and advantages of the present invention for a lens parameter measurement using optical sectioning may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

The present invention provides a nondestructive measurement technique for measuring all of the physical dimensions of a hydrated contact lens. The measurable dimensions include the front curve radius, lenticular curve radius, peripheral curve radius, back curve radius, diameter, center of lens thickness, sagittal height, power, and aspherical deviations. The lenticular and peripheral juncture is also discernible. Heretofore in the prior art, many of these parameters were not measurable and, if measurable, suffered from inaccuracies and/or damage or destruction of the lens being measured.

Figure 1:
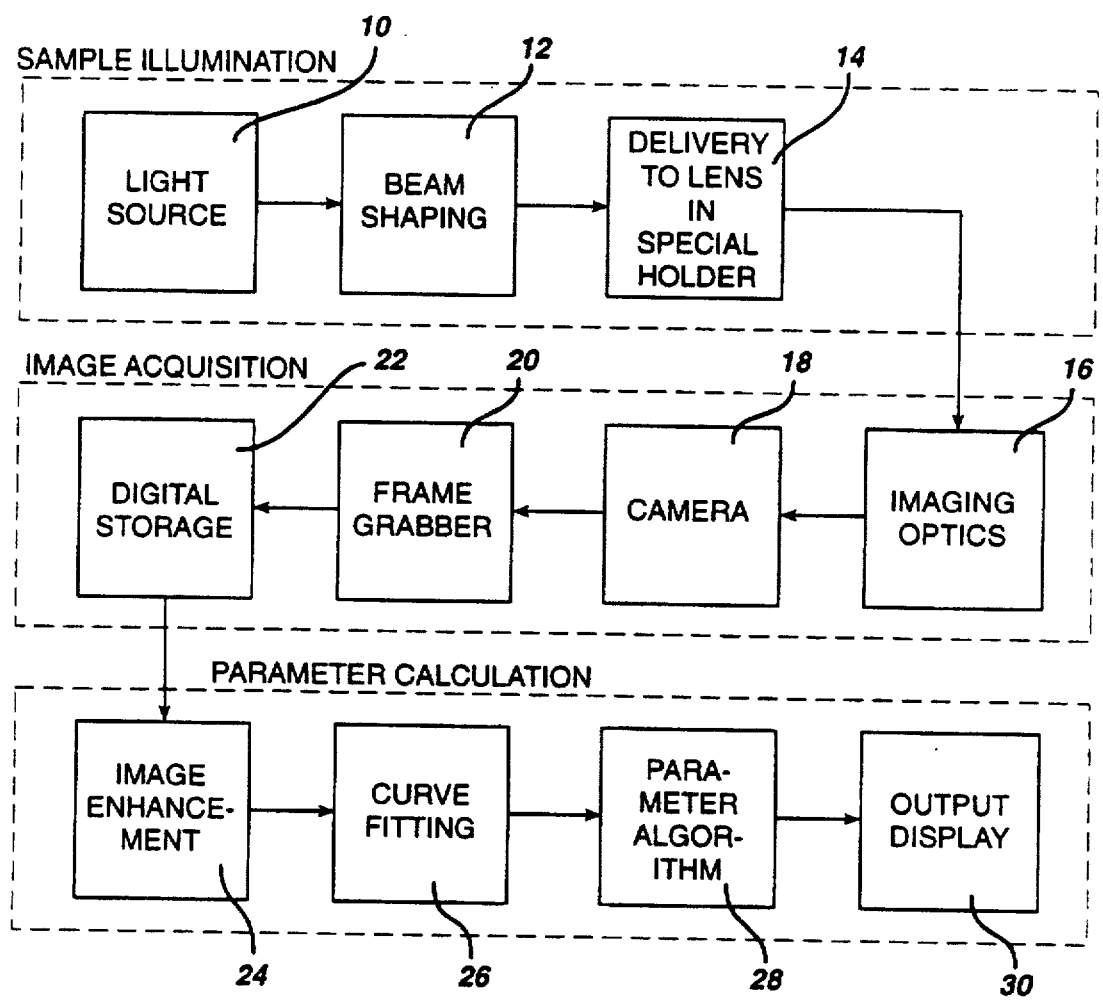
FIG. 1 illustrates a flow chart of a preferred process for lens parameter measurement using optical sectioning pursuant to the present invention.

FIG. 1 illustrates a flow chart of a preferred process in which light from a light source 10 is shaped at 12 into a desired beam shape as a line of light which is directed onto a lens positioned in a lens holding fixture at 14. An image of the illuminated lens is directed by imaging optics 16 onto a camera 18, and an image is captured by a frame grabber 20, and digitally stored in memory at 22. The stored digital image is then subjected to image processing, including image enhancement at 24, curve fitting at 26, and measurement of pertinent parameters of the lens by the application of appropriate algorithms at 28, and the measured parameters are then displayed at 30.

The light source may be any high intensity light generator such as a laser diode, arc lamp, or high radiance LED. Reduction to practice has been with a laser, however a high radiance LED may be preferred in some embodiments. A preferred wavelength may be infrared (IR) just in the invisible range. The required light intensity is dependent upon the sensitivity of the detection system. At the extremes, too high an intensity could damage or modify the lens being measured, while at the other extreme, no detectible image would be generated. The ideal is a small thin line of intense light in a small source.

Figure 2:
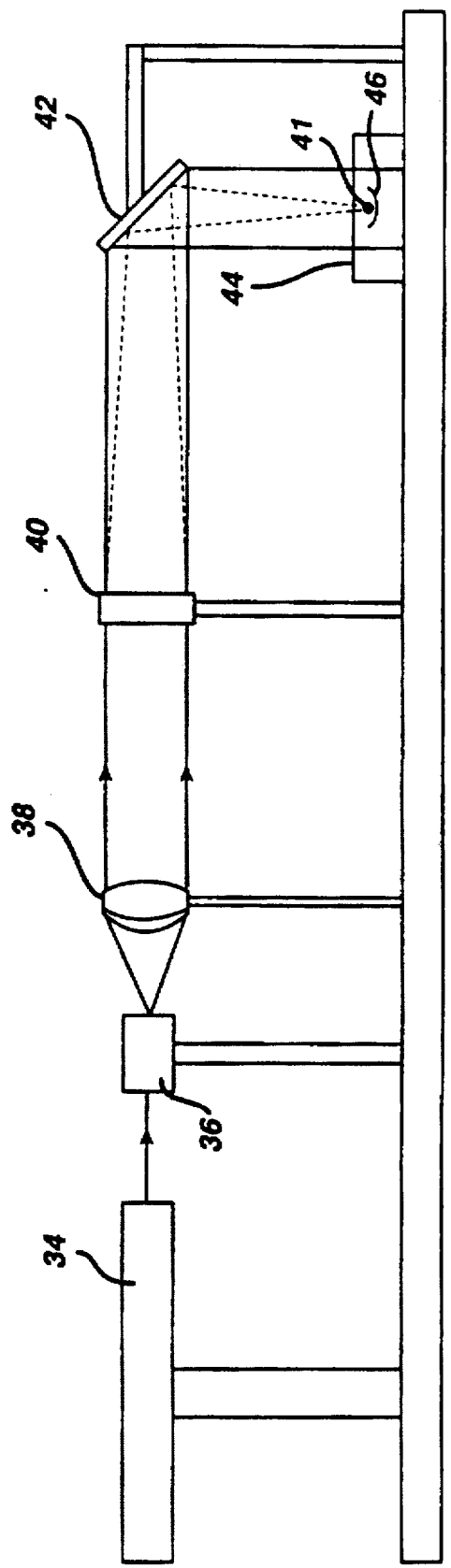
FIG. 2 illustrates one embodiment on an optical arrangement for shaping and focusing a beam of light in which light from a source passes through a spatial filter, is collimated by a collimating lens, and is focused by a cylindrical lens into a line of light at the contact lens being measured.

FIG. 2 illustrates one embodiment of an optical arrangement for shaping and focusing a beam of light, in which light from a source 34 passes through a spatial filter 36, and is collimated by a collimating lens 38. A cylindrical lens 40 focuses the collimated beam into a line of light at the contact lens 41. A mirror 42 is angularly adjustable to properly position the focused line of light relative to the contact lens. The contact lens is positioned on a pedestal 44 in an oobservation support cup 46 in which it is immersed in saline solution.

FIG. 2 illustrates a basic approach to providing the cross-sectioning light and picking up the scattered light image. A line of light can be formed by spatially filtering, collimating and cylindrically focusing an $Ar^{2+}$ (4880 A, nominally 20 mW) laser beam. The resultant line of light beam passes through a mounting cell, as shown in FIGS. 2–10, holding a lens immersed in saline solution. The scattered light is received by a lens which focuses it onto a detection camera.

Figure 3:
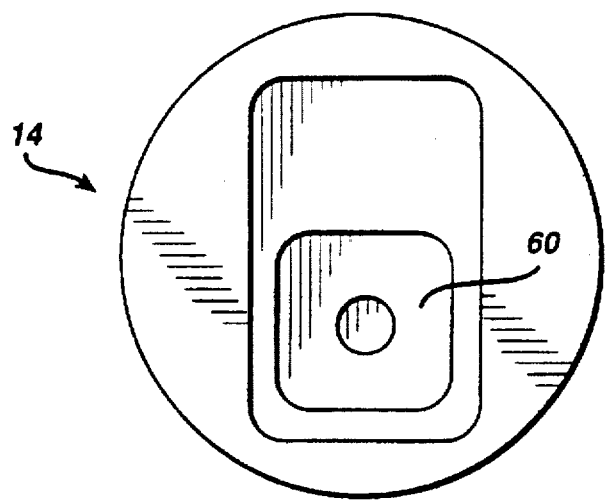
FIGS. 3, 4 and 5 are respectively top planar, and end and side elevational, views of a support fixture for holding a contact lens during the measurement technique of the present invention.
Figure 4:
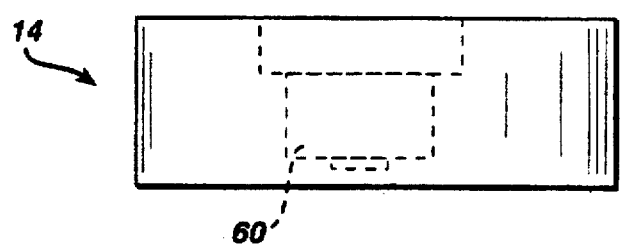
Figure 5:
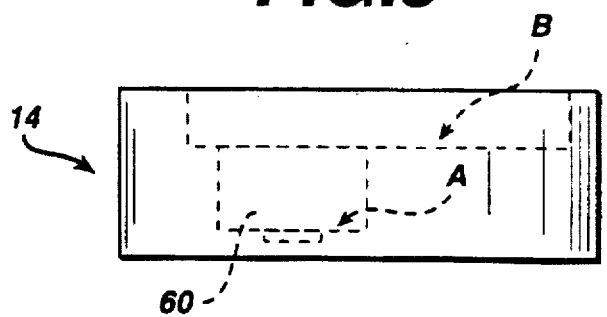
Figure 6:
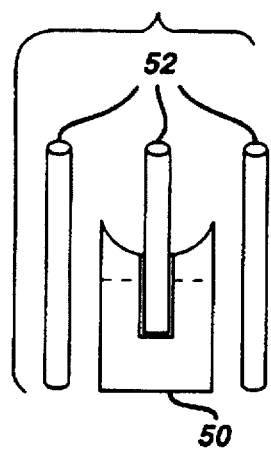
FIGS. 6 and 7 are respectively side elevational and top planar views of a central support button and surrounding alignment posts to properly position a contact lens within a support fixture.
Figure 7:
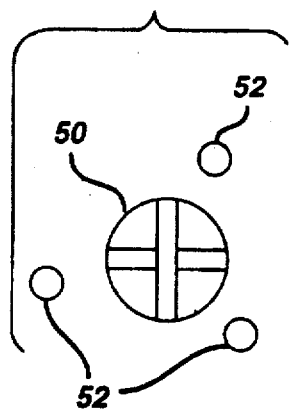
Figure 8:
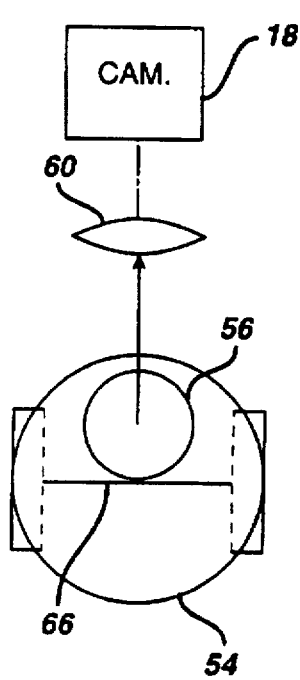
FIGS. 8 and 9 are respectively top planar and side elevational views of an optical glass flat, having a prism positioned on top thereof, positioned on slide rails.
Figure 9:
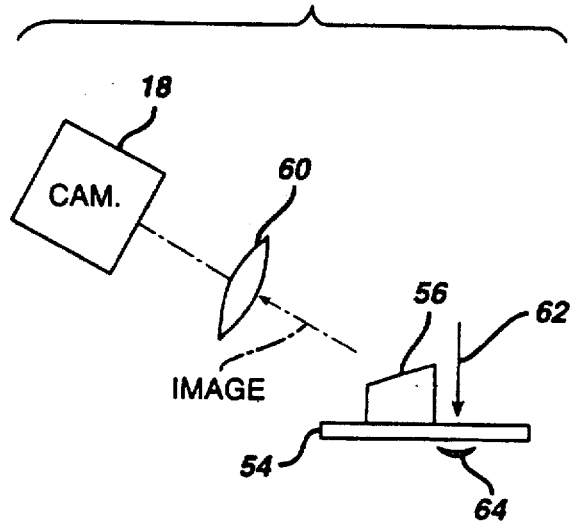
Figure 10:
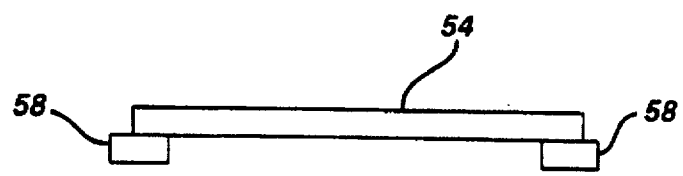
FIG. 10 is a side elevational view of only the optical flat and slide rail assembly.

The lens being measured can be positioned using a support fixture 14, such as that illustrated in greater detail in FIGS. 3–10. FIGS. 3, 4 and 5 are respectively top planar, and end and side elevational, views of a support fixture for holding a contact lens during the measurement technique of the present invention. FIGS. 6 and 7 are respectively side elevational and top planar views of a central support button and surrounding alignment posts to properly position a contact lens within the support fixture. FIGS. 8 and 9 are respectively top planar and side elevational views of an optical glass flat, having a prism positioned on top thereof, positioned on slide rails in the support fixture, and FIG. 10 is a side elevational view of only the optical flat and slide rail assembly.

Referring to FIGS. 3–10, a central support button 50 and cooperating alignment posts 52 are positioned at level A, FIG. 5, in the fixture 14. The top of the alignment posts 52 do not extend above a level B in the fixture 14. An optical flat 54 with a prepositioned 10 degree wedge prism 56 is slidably engaged on slide rails 58 which rest at level B in the fixture 14. The lower surface of the optical flat 54 is positioned slightly below the level of the saline solution to remove any optical distortions as might otherwise be caused by ripples on the surface of the saline solution.

In operation, a cavity 60 in the fixture is filled with saline solution. The optical flat 54 guided by the slide rails 58 is slided to the right (in FIG. 5) so as to clear the area over the button 50 and cooperating alignment posts 52. The lens being measured is dropped or lowered into the saline solution between the three essentially uniformly positioned alignment posts 52. As the lens sinks in the saline solution, it normally touches (bumps) one or more of the alignment posts 52 and comes to rest on the top of the support button 50 in an essentially horizontal position. The optical flat 54 is then slided to the left extreme (in FIG. 5) which positions it properly above the lens for an optical sectioning measurement.

The mounting cell 14 is designed to allow most of the excess laser light to be absorbed at the bottom of the cell out of the view of the camera. The optical flat 54 and wedge prism 56 are used with the cell in the detection system to aid in correcting image distortions produced by the surface of the solution covering the lens and the viewing angle.

The lens can be correctly positioned by hand with respect to the scanning line of light, or the position of the scanning line of light can be adjusted, as by the mirror 42, so as to cause an image to occur on a desired diameter (normally the center diameter) of the lens being measured. In appropriate circumstances, the contact lens might be rotated to position the line of light along a different meridian (different angular diameter) of the lens. In a continuous mode of operation, such as on a production line, the light source is energized, and the image from the camera is checked to verify that the light image is on the desired proper diameter. Either the camera or the holder can be physically adjusted so as to place the image on a selected diameter. The slight adjustment movement can be provided by motors or by a positioning cylinder.

The energized light source causes a detectable line of light (through a vertical section of the contact lens) to be imaged, and allows for either the holder or the camera to be spatially adjusted. Movement must be only to and fro so that the line of light illuminating the lens is maintained in parallel alignment with the imaging camera so as to not introduce distortion into the subsequent image enhancement and measurement.

When the light source illuminates the mounted lens, light is scattered by the surfaces of the lens and produces a bright area on the external surfaces of the lens (the illuminated surfaces contacted by the line of light). The prism 56 provides a suitable magnification (spread) of the image which is relayed by an imaging optical system 60 so as to nearly fill the detection area or screen of the imaging camera 18. One advantageous position for the imaging camera 18 is at a right angle to the light source at the level of the contact lens specimen. Practicality dictates that the camera be elevated and view the lens at an angle. The camera views the contact lens over the edge of the cup and at an angle greater than the critical angle. The critical angle is defined as the minimum angle at which light is transmitted through the surface of the saline solution, and below which all light is reflected by the surface of the saline solution and none transmitted. A saline-air interface correction is required as explained herein-below. The imaging camera is positioned to account for the Scheinpflug effect, i.e. all optical paths are of equal length. The raw image is captured by a frame grabber 20 and transferred to digital storage 22.

As illustrated in FIGS. 8 and 9, the illuminating light 62 is usually positioned normally to the surface of the optical flat 54 directly above a contact lens 64, and is in the form of a line of light 66.

The image detection apparatus can incorporate a COHU Model 4810 Camera and Data Translation Model 2855 Frame Grabber. A Melles-Griot Cooke Triplet lens optimized for infinite conjugate images a cross-sectional image onto the camera, accounting for the Scheinpflug condition.

Software has been developed to process the image, including image acquisition, filtering, sorting and calculations. An image processing macro routine combines many of the morphological routines into one sequence which is executed for each image, the result of which is stored digitally. The stored image is then input to a software routine for sorting and calculation of parameters. In greater detail, the image is acquired and preprocessed by several stages of filtering for the purpose of removing extraneous background noise. The filtered image is then thresholded so that only the lens profile is visible. The profile is then fit to cartesian coordinates, smoothed with a sliding three point filter, and translated into two arrays, a first array for the back surface, and a second array for the front surface. Each surface is then inputted to a curve fitting algorithm and its function coefficients calculated.

The parameter calculation is based upon a powerful nonlinear regression technique based upon the residuals error from a Taylor Series expansion of the expected curve profile. In greater detail, the estimates of the time residual differences between empirical values of the fitting function and actual values, and the estimated residuals, are incrementally improved by expanding the actual functional residuals with a linear Taylor series about the estimated values. This equation is reorganized in terms of the actual and estimated residuals, and a set of parameters is found which minimizes the sum of the squares of the true residuals. This function has a minimum value when all of its partial derivatives with regard to the fitting function coefficients are zero. This set of nominal equations is solved by obtaining the first order approximations to the incremental improvements mentioned above. The process is then iterated using the improved values until the increments fall below a specified tolerance. This method tends to converge very rapidly, and allows the data to be fit to any arbitrary function for contact lenses, which allows the output of the software to be used as feedback in a manufacturing process.

Figure 11:
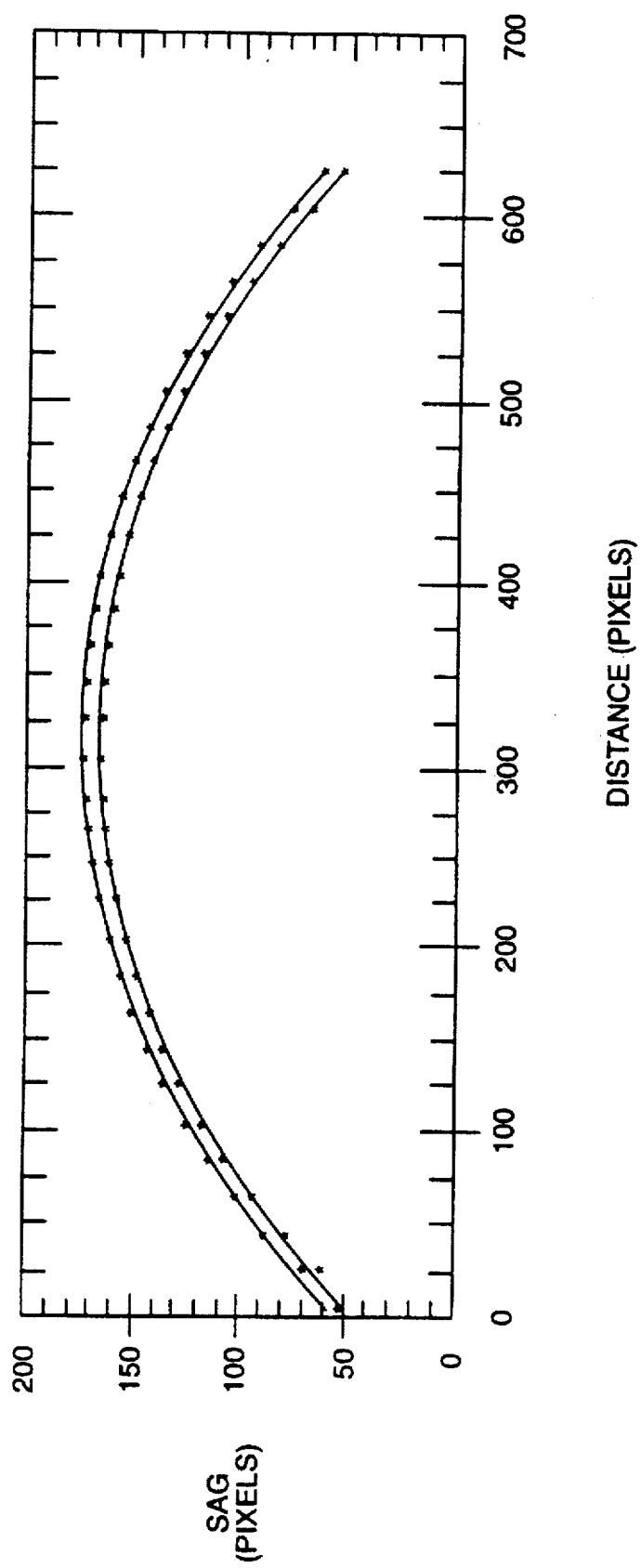
FIG. 11 illustrates a curve fit approximation to the measured points of a contact lens pursuant to the processing techniques of the present invention, with the curve being of sag in pixels versus distance in pixels across a measured cross-section of a contact lens.

FIG. 11 illustrates a curve fit approximation to the measured points of a contact lens pursuant to the processing techniques of the present invention, with the curve being of sag in pixels versus distance in pixels across a measured cross-section of a contact lens.

Optical sectioning of a lens is provided by the present invention to improve the accuracy of lens parameter measurements. The most critical parameters include center thickness, thickness profile, radii of curvature and asphericity of the front curve, back curve and lenticular curve, and the diameter as a function of radial and azimuthal position. From these values the lens power can also be readily calculated from known equations.

In the optical sectioning technique, the lens is optically sectioned using a pseudo-coherent light source which is scattered sufficiently from the illuminated surface of the lens material. The image is captured by a solid state camera and frame grabber, and analyzed using typical image processing algorithms. In one embodiment, the technique was evaluated using an Argon ion laser emitting at the 488 nm line with a power of 30 mW, a COHU 4810 CCD camera and a Data Translation 2855 frame grabber. Tests were conducted using several dozen soft hydrogel contact lenses. The results indicated that the optical or laser sectioning technique measured the center thickness, the thickness profile, the radii of curvature of the front curve and the back curve, the diameter, the lenticular radius of curvature, and the asphericity as a function of radial and azimuthal position repeatably and with sufficient accuracy. Therefore, the lens power could be calculated with repeatability and accuracy.

While several embodiments and variations of the present invention for a lens parameter measurement using optical sectioning are described in detail herein, it should be apparent that the disclosure and teachings of the present invention will suggest many alternative designs to those skilled in the art.

What is claimed is:

1. A method of measuring desired parameters of a contact lens by optical sectioning comprising:
   a. positioning a contact lens on a support fixture;
   b. generating a line of light;
   c. directing the line of light through a selected diameter of the contact lens;
   d. detecting as an image the light scattered at the surfaces of the contact lens at the selected diameter; and
   e. analyzing the detected light image to measure at least four basic parameters of the contact lens comprising the diameter (D), front radius of curvature (FC), back radius of curvature (BC), and center thickness (CT).

2. A method as claimed in claim 1, wherein the analyzing step provides the measured parameters of the contact lens which include the front radius of curvature with aspheric form, the back radius of curvature with aspheric form, the center thickness, the diameter, the lenticular curve radius, the peripheral curve radius, the sagittal height, aspherical deviations, and the power of the lens.

3. A method as claimed in claim 1, wherein the line of light is directed onto a support fixture which includes a container in which a pedestal is positioned, the container is filled with a saline solution, and the lens is placed on the pedestal completely immersed in the solution, and the line of light is directed over the edge of the container and through a selected diameter of the contact lens.

4. A method as claimed in claim 3, wherein a charge coupled television (CCTV) imaging camera detects the image of light scattered from the surfaces of the contact lens.

5. A method as claimed in claim 4, wherein the imaging camera is elevated with respect to and views the lens at an angle greater than the critical angle relative to the surface of the saline solution, which critical angle is the minimum angle at which light is transmitted and below which all light is reflected and none transmitted by the surface of the saline solution.

6. A method as claimed in claim 1, wherein the contact lens is immersed in saline packaging solution in a packaging container.

7. A method as claimed in claim 1, wherein the detection system includes an optical flat, an optical prism mounted on the optical flat, and an imaging lens system.

8. A method as claimed in claim 1, wherein the image is analyzed by a software program which uses a nonlinear least squares fitting data processing approach.

9. A method as claimed in claim 1, wherein the step of analyzing includes an image processing macro routine which combines several morphological routines into one sequence which is executed for each image, the result of which is stored digitally, and the stored image is then input to a software routine for calculation of selected parameters of the contact lens.

10. A method as claimed in claim 9, wherein the parameter calculation is based upon a nonlinear regression based upon residuals error from a Taylor Series expansion of an expected contact lens curve profile.

11. A method as claimed in claim 1, wherein the step of generating includes the steps of shaping and focusing a beam of light in which light from a light source passes through a spatial filter, is collimated by a collimating lens, and is focused by a cylindrical lens into a line of light at the contact lens being measured.

12. A method as claimed in claim 1, wherein the line of light is directed onto the support fixture which includes a central support button, surrounded by alignment posts to properly position a contact lens within the support fixture.

13. A method as claimed in claim 12, wherein the central support button and alignment posts are positioned at a level A in the fixture, and the top of the alignment posts do not extend above a level B in the fixture, an optical flat with a prism positioned thereon is slidably positioned on slide rails and rests at the level B, a cavity in the fixture is filled with saline solution, the optical flat is guided by the slide rails to slide to one side while clearing the area over the central support button and alignment posts, the contact lens being measured is lowered into the saline solution between the alignment posts, and comes to rest on the central support button in an essentially horizontal position, and the optical flat is then slided to a second opposite side to position it above the contact lens.

14. A method as claimed in claim 13, wherein the optical flat has its lower surface immersed in the saline solution to eliminate optical distortions by the surface of the solution.

15. A method as claimed in claim 1, wherein the contact lens is immersed in saline solution while positioned on the support fixture.

16. A method as claimed in claim 1, wherein light from a light source is shaped into a line of light which is directed onto a contact lens positioned in the support fixture, light from the illuminated contact lens is directed by imaging optics onto a camera, an image is captured by a frame grabber and digitally stored in memory, the stored digital image is then subjected to image processing, including image enhancement, curve fitting, and measurement of parameters of the lens by the application of selected algorithms.

17. A method as claimed in claim 1, wherein the detecting step is performed with a camera positioned to view the contact lens through a prism and at an angle relative to a vertical.

18. Apparatus for measuring desired parameters of a contact lens by optical sectioning comprising:
   a. a support fixture for positioning a contact lens being measured;
   b. means for generating and directing a line of light through a selected diameter of the contact lens; and
   c. means for detecting as an image the light scattered at the surfaces of the contact lens at the selected diameter, and for analyzing the detected light image to measure at least four basic parameters of the contact lens comprising the diameter (D), front radius of curvature (FC), back radius of curvature (BC), and center thickness (CT).

19. Apparatus as claimed in claim 18, wherein the support fixture includes a container in which a pedestal is positioned, the container is filled with a saline solution, and the lens is placed on the pedestal completely immersed in the solution, and the line of light is directed over the edge of the container and through a selected diameter of the contact lens.

20. Apparatus as claimed in claim 19, wherein a charge coupled television (CCTV) imaging camera detects the image of light scattered from the surfaces of the contact lens.

21. Apparatus as claimed in claim 20, wherein the imaging camera is elevated with respect to and views the lens at an angle greater than the critical angle relative to the surface of the saline solution, which critical angle is the minimum angle at which light is transmitted and below which all light is reflected and none transmitted by the surface of the saline solution.

22. Apparatus as claimed in claim 18, wherein the contact lens is immersed in saline packaging solution in a packaging container.

23. Apparatus as claimed in claim 18, wherein the detection system includes an optical flat, an optical prism mounted on the optical flat, and an imaging lens system.

24. Apparatus as claimed in claim 18, wherein said means for generating and directing includes an arrangement in which light from a light source passes through a spatial filter, is collimated by a collimating lens, and is focused by a cylindrical lens into a line of light at the contact lens being measured.

25. Apparatus as claimed in claim 18, wherein the support fixture includes a central support button, surrounded by alignment posts to properly position a contact lens within the support fixture.

26. Apparatus as claimed in claim 25, wherein the central support button and alignment posts are positioned at a level A in the fixture, and the top of the alignment posts do not extend above a level B in the fixture, an optical flat with a prism positioned thereon is slidably positioned on slide rails and rests at the level B, a cavity in the fixture is filled with saline solution, the optical flat is guided by the slide rails to slide to one side while clearing the area over the central support button and alignment posts, the contact lens being measured is lowered into the saline solution between the alignment posts, and comes to rest on the central support button in an essentially horizontal position, and the optical flat is then slided to a second opposite side to position it above the contact lens.

27. Apparatus as claimed in claim 18, including means for immersing the contact lens in saline solution while positioned on the support fixture.

28. Apparatus as claimed in claim 18, wherein light from the illuminated contact lens is directed by imaging optics onto a camera, an image is captured by a frame grabber and digitally stored in memory, and the stored digital image is then subjected to image processing for measurement of the parameters of the lens.

* * * * *